Feb. 11, 1969      R. J. McKNIGHT III      3,426,566
INTERMEDIATE SUPPORTING ROLL BEARING BLOCK
Filed Dec. 1, 1966
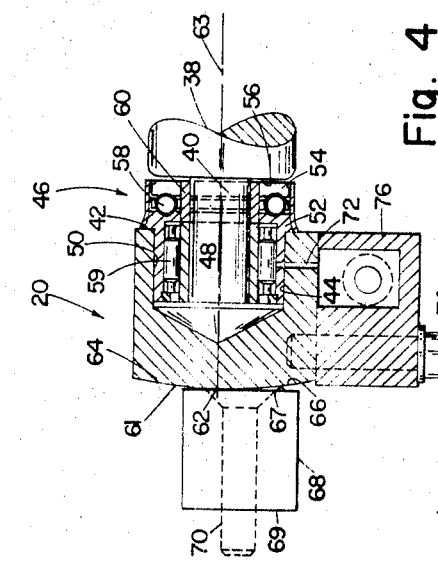
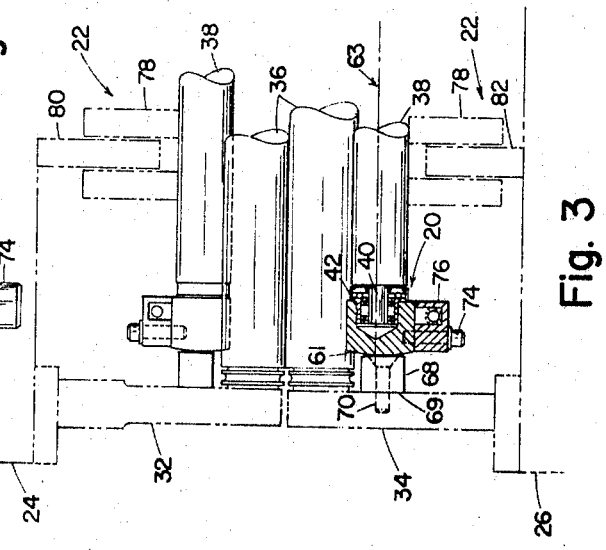
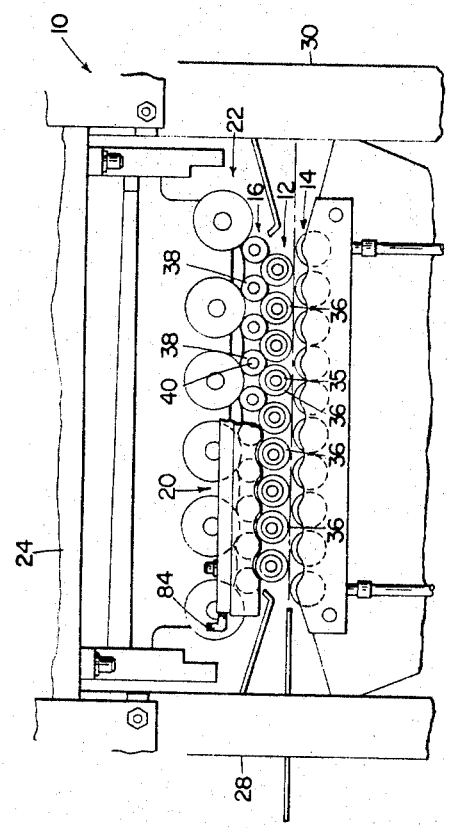
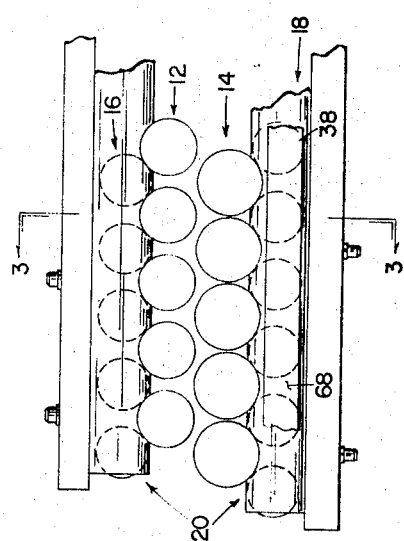
INVENTOR.
Robert J. McKnight III
BY Stanley J. Prince
his Attorney.

United States Patent Office 3,426,566
Patented Feb. 11, 1969

3,426,566
INTERMEDIATE SUPPORTING ROLL
BEARING BLOCK
Robert J. McKnight III, Pittsburgh, Pa., assignor to Voss Engineering Company, Callery, Pa., a corporation of Pennsylvania
Filed Dec. 1, 1966, Ser. No. 598,412
U.S. Cl. 72—163  6 Claims
Int. Cl. B21d 1/02, 3/02; F16c 19/04

This invention relates to new and useful improvements in so-called six-high roller levelers for straightening metal sheets. More particularly it is directed to an improved type bearing block for the intermediate supporting rolls of the leveler.

On account of the deflection of the intermediate supporting rolls during operation of the leveler, the bearings journaling the intermediate supporting rolls and the journaled bearing necks of the intermediate supporting rolls are subjected to uneven pressures when bearings with rigidly fixed locations are utilized. Also, during operation of the leveler the intermediate supporting rolls experience an undesired lateral thrust causing damage to the bearings and the surfaces of the intermediate supporting rolls at the jointure of the bearing necks and body of the intermediate supporting rolls. This combination of uneven pressures and undesired lateral thrust results in rapid and excessive wear to the intermediate supporting rolls.

In the past, see the patent to Maust, 3,078,909, issued Feb. 26, 1963, the intermediate supporting rolls have been journaled in common bearing block units with the work rolls of the leveler. The common bearing block units being free to rock around huge pins connecting the bearing block units to saddles which in turn were rigidly connected to a cross-member forming a part of the leveler. Another prior art device shown in the patent to Maussnest, 2,009,508, issued July 30, 1935, journaled the intermediate supporting rolls in bearing bodies supported by upright supports fixed to the frame of the leveler. The supporting surfaces of both bearing bodies and upright supports had curvilinear contours permitting the bearing bodies to change their location whenever the intermediate supporting rolls were flexed. Neither of these prior art devices, however, dealt with or adequately served the purpose of eliminating the damaging effect of the lateral thrust experienced by the intermediate supporting rolls during operation of the leveler. Further, as the bearing supports of these prior art devices were indirectly or directly rigidly connected to the frame of the leveler, removal of the intermediate supporting rolls from the leveler was cumbersome. In order to remove the intermediate supporting rolls from the leveler the leveler had to be substantially dismantled.

The present invention overcomes the above difficulties by providing a movable bearing block that accommodates for the uneven pressures on the bearing necks and bearings journaling the intermediate supporting rolls. The bearing block also provides for the undesired lateral thrust experienced by the intermediate supporting rolls. Further, the bearing block is so constructed and arranged for easy removal thereof from the leveler to facilitate withdrawal of the intermediate supporting rolls bodily axially from the roller leveler for the purpose of changing, inspection and repair thereof.

Briefly, the present invention is directed to an elongated bearing block easily removable from the leveler and adapted to house a plurality of bearings which provide for both lateral thrust and rotatable support of the intermediate supporting rolls of the leveler. The bearing block is further adapted to rock on one of its faces upon deflection of the intermediate supporting rolls thereby minimizing the effects of the combination of uneven pressures and lateral thrust experienced by the bearings and intermediate supporting rolls during operation of the leveler.

It is accordingly a primary object of the present invention to provide a bearing block that will adjustably rotatably support and provide for lateral thrust of the intermediate supporting rolls of a six-high roller leveler to minimize the combination of uneven pressures and lateral thrust experienced by the bearings and intermediate supporting rolls during operation of the leveler.

Another object of the invention is to provide a bearing block constructed and arranged for easy removal from the leveler to facilitate withdrawal of the intermediate supporting rolls bodily axially from the leveler when desired without a substantial dismantling of the leveler.

These and other objects and advantages of this invention will be more completely disclosed and described in the following specification, the accompanying drawings and the appended claims.

FIGURE 1 is a partial side view of a six-high roller leveler with some parts removed.

FIGURE 2 is a detail view of the work rolls and intermediate rolls of the six-high roller leveler shown in FIGURE 1 with additional parts removed therefrom.

FIGURE 3 is a view taken along the lines 3—3 in FIGURE 2.

FIGURE 4 is an enlarged detail view of the lower bearing block shown in FIGURE 3.

Now referring to the drawings, a six-high roller leveler is shown generally at 10. Arranged in two banks shown generally at 12 and 14 are the sheet engaging work rolls. Above and below and in contact with the two banks of work rolls are intermediate supporting rolls also arranged in two banks which maintain the work rolls against horizontal and vertical deflection shown generally at 16 and 18. The two banks of intermediate rlols 16 and 18 are journaled in bearing blocks shown generally at 20. Above and below and in contact with the intermediate supporting rolls are a plurality of back-up roll sections shown generally at 22 which support and maintain the intermediate supporting rolls against horizontal and vertical deflection.

Now referring in more detail to the drawings, the six-high roller leveler 10 comprises an upper frame member 24 and a lower frame member 26. Suitably secured to upper frame member 24 and lower frame member 26 are upright supports 28 and 30 which together with members 24 and 26 form a rigid end frame. To upper frame member 24 and lower frame member 26 are secured in a suitable manner primary supports 32 and 34 which serve the purpose to rotatably support the bearing ends 35 of each of work rolls 36.

Each of the intermediate supporting rolls 38 is positioned in staggered relation with respect to the work rolls 36 and in contact therewith to maintain the work rolls 36 against vertical and horizontal deflection. The intermediate supporting rolls 38 have bearing necks 40 at their opposite ends journaled in bearing block 20.

Bearing block 20 has a front face 42 having a plurality of openings, one of which is shown at 44, which partially receive an anti-friction bearing shown generally at 46. The bearing 46 is received in opening 44 and abuts front face 42 of bearing block 20. The bearing 46 comprises a combination needle thrust bearing having an inner race 48 and outer race 50 forming part of outer thrust race 52. Inner thrust race 54 upon intermediate supporting rolls 38 experiencing lateral thrust abuts surface 56 at the jointure of the bearing necks 40 and the body of the intermediate supporting rolls 38, thereby through bearing balls 58 and thrust race 52 minimize the effects of the lateral thrust. Between outer race 50 and inner race 48 are needle bearings 59 for the rotatable support of the bearing necks 40. Also, mounted on the bearing necks of intermediate supporting rolls 38 is bearing spacer 60.

Bearing block 20 has a convex shaped rear face 61. The place of contact between the rear face 61 and the front face 67 of a spacer block 68 is located at 62 on the center lines 63 of intermediate supporting rolls 38. Above and below the place of contact 62 of convex rear face 61 are curved surfaces 64 and 66. The convex shaped rear face 61 of bearing block 20 abuts the front face 67 of spacer block 68 along its length at 62. The rear face 69 of spacer block 68 abuts primary support 34. Spacer block 68 is connected to primary support 34 by means of screw bolt 70. Upon deflection of the intermediate supporting rolls the bearing block 20 rocks on its rear face on spacer block 68 thereby minimizing the uneven pressures that would be placed upon an intermediate support roll 38 if rigid fixed locations were utilized for the bearings supporting the intermediate supporting rolls.

In addition to bearing receiving openings 44, bearing block 20 has openings or passageways 72 for the lubrication of bearings 46. Mounted on bearing block 20 and connected thereto by bolts 74 is lubrication manifold 76. Lubrication manifold 76 supplies a lubricant to bearing 46 through passageways 72.

It will be noted that whereas only one bearing block 20 has been described there are similar bearing blocks journaling both ends of both the upper and lower banks of intermediate supporting rolls.

Above and below and in contact with the intermediate supporting rolls 38 are back-up roll sections 22 which are the sole support of the intermediate supporting rolls 38 with respcet to frame members 24 and 26. It can be readily seen in FIGURE 3 that the bearing block 20 journaling the intermediate supporting rolls 38 is not connected to primary support 34 but is held in position by spacer block 68 and back-up roll sections 22.

Back-up roll sections 22, one of which is shown in FIGURE 3, comprise short back-up rolls 78 rotatably supported from upper frame 24 and lower frame 26 by depending secondary supporting members 80 and 82, respectively. There are a plurality of back up roll sections 22 located along the longitudinal axes of each of the banks of the intermediate support rolls to support and maintain the intermediate support rolls against horizontal and vertical deflection.

In order to remove any of the intermediate rolls 38 from the six-high roller leveler 10, it is only necessary to disconnect the lubrication system of the bearings at 84 from the manifold block 76 and lift the bearing block 20. The exposed intermediate supporting rolls can then be bodily axially removed from the leveler for the purpose of changing, inspection and repair.

According to the provisions of the patent statutes, I have explained the principle, preferred construction, and mode of operation of my invention and have illustrated and described what I now consider to represent its best embodiment. However, I desire to have it understood that, within the scope of the appended claims, the invention may be practiced otherwise than as specifically illustrated and described.

What is claimed is:

1. In a six-high roller leveler, the combination of upper and lower frame means, primary support means fixed to said frame means rotatably supporting a plurality of work rolls, said work rolls arranged in two banks to flex work material therebetween, a plurality of intermediate supporting rolls arranged in banks in staggered relation with respect to said work rolls and in contact therewith to maintain said work rolls against vertical and horizontal deflection, said intermediate supporting rolls having bearing necks at opposite ends thereof, said bearing necks being journaled in bearing block means, said bearing block means having a front face and a rear face, said front face having a plurality of openings therein adapted to receive bearing means, a plurality of spacer block means, said spacer block means having a front face and a rear face, the rear face of said bearing block means abutting the front face of said spacer block means, the rear face of said spacer block means abutting said primary support means, the rear face of said bearing block means providing means to rock on the front face of said spacer block means when the work rolls and intermediate rolls are being deflected, and a plurality of secondary support means carried by each said upper and lower frame means to rotatably support a plurality of back-up roll sections, said back-up roll sections located along the longitudinal axis of each of said banks of intermediate supporting rolls and in contact therewith to thereby support and maintain said intermediate supporting rolls against vertical and horizontal deflection.

2. The apparatus of claim 1 wherein the rear face means of said bearing block means abutting said spacer block means is convex in shape so that upon deflection of said work rolls and intermediate supporting rolls said bearing block means may rock on said spacer block means thereby minimizing the pressures on the intermediate supporting rolls during operation of the leveler.

3. The apparatus of claim 2 wherein the place of contact of said rear face means of said bearing block means with said spacer block means is located on the center lines of said intermediate supporting rolls.

4. The apparatus of claim 1 wherein said bearing means comprise a combination needle thrust bearing for rotatable support of the intermediate supporting rolls and the minimizing of lateral thrusts experienced by the intermediate supporting rolls during operation of the leveler.

5. The apparatus of claim 1 wherein said spacer block means is affixed to said primary support means and positioned between said primary support means and said bearing block means thereby holding said bearing block means in position with respect to said primary support means.

6. The apparatus of claim 1 wherein said bearing block means has a plurality of passageways therein adapted to receive a lubricant for said bearing means from lubrication means connected to said bearing block means.

References Cited

UNITED STATES PATENTS

| | | | |
|---|---|---|---|
| 1,890,342 | 12/1932 | Sutton et al. | 72—163 |
| 2,429,142 | 10/1947 | Thomas | 72—163 |
| 2,665,959 | 1/1954 | Hyams | 308—233 |

MILTON S. MEHR, *Primary Examiner.*

U.S. Cl. X.R.

308—174